United States Patent
Lee et al.

(10) Patent No.: US 9,201,272 B1
(45) Date of Patent: Dec. 1, 2015

(54) METHOD OF MANUFACTURING LIQUID CRYSTAL DISPLAY

(71) Applicant: SAMSUNG DISPLAY CO., LTD., Yongin, Gyeonggi-do (KR)

(72) Inventors: Mihwa Lee, Seoul (KR); Suk Hoon Kang, Seoul (KR); BongSung Seo, Gyeonggi-do (KR); Hongyeon Lee, Seoul (KR); Yeongrong Park, Gyeonggi-do (KR); Junwoo Lee, Gyeonggi-do (KR); Baekkyun Jeon, Gyeonggi-do (KR); Jaeweon Hur, Busan (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/614,810

(22) Filed: Feb. 5, 2015

(30) Foreign Application Priority Data

Jun. 2, 2014 (KR) ........................ 10-2014-0067096

(51) Int. Cl.
*H01J 9/00* (2006.01)
*G02F 1/1337* (2006.01)

(52) U.S. Cl.
CPC .... *G02F 1/133788* (2013.01); *G02F 1/133711* (2013.01)

(58) Field of Classification Search
CPC ...................... G02F 1/133788; G02F 1/133711
USPC ...................................................... 445/23–25
See application file for complete search history.

(56) References Cited

U.S. PATENT DOCUMENTS

| | | | |
|---|---|---|---|
| 6,025,900 | A | 2/2000 | Yoon et al. |
| 6,063,829 | A | 5/2000 | Endou et al. |
| 6,327,018 | B1 | 12/2001 | Park |
| 2009/0130343 | A1 | 5/2009 | Cheon |
| 2013/0029087 | A1 | 1/2013 | Hatanaka et al. |
| 2013/0128187 | A1 | 5/2013 | Matsui et al. |

FOREIGN PATENT DOCUMENTS

| | | |
|---|---|---|
| JP | 2003-241197 | 8/2003 |
| JP | 2004-206091 | 7/2004 |
| JP | 2010-049230 | 3/2010 |
| JP | 2001-290155 | 10/2011 |
| JP | 2012-155308 | 8/2012 |
| KR | 1020080090680 | 10/2008 |
| KR | 1020090056509 | 6/2009 |
| KR | 1020130097175 | 9/2013 |

*Primary Examiner* — Joseph L Williams
(74) *Attorney, Agent, or Firm* — F. Chau & Associates, LLC

(57) ABSTRACT

A liquid crystal display may be manufactured by forming a first alignment layer on a first base substrate, forming a second alignment layer on a second base substrate, disposing liquid crystal on the first alignment layer or the second alignment layer, and combining the first base substrate and the second base substrate with each other. At least one of the first and second alignment layers may be formed by forming an alignment solution including an alignment agent and a cross-linking agent on the first or second base substrate. The alignment solution is cured at a first temperature to form an alignment layer. The base substrate is exposed to light or an electron beam to align the alignment layer. The alignment layer is baked at a second temperature. The first temperature is lower than a cross-linking reaction temperature of the cross-linking agent.

20 Claims, 11 Drawing Sheets

METHOD OF MANUFACTURING LIQUID CRYSTAL DISPLAY

CROSS-REFERENCE TO RELATED APPLICATION

This U.S. non-provisional patent application claims priority under 35 U.S.C. §119 to Korean Patent Application No. 10-2014-0067096, filed on Jun. 2, 2014, the disclosure of which is incorporated by reference herein in its entirety.

TECHNICAL FIELD

Exemplary embodiments of the present invention relate to a liquid crystal display, and more particularly to methods of manufacturing a liquid crystal display.

DISCUSSION OF RELATED ART

Examples of liquid crystal displays include a twisted nematic type liquid crystal display, a horizontal electric field type liquid crystal display and a homeotropic alignment type liquid crystal display.

In the homeotropic alignment type liquid crystal display, liquid crystals may be aligned in a predetermined direction in a state in which an electric field is not applied, and a major axis of liquid crystal molecules may be aligned perpendicular to the substrate surface. The homeotropic alignment type liquid crystal display may have a wide viewing angle and a high contrast ratio.

A rubbing method or a photo-alignment method may be used as a method of aligning the liquid crystal molecules in a predetermined direction when an electric field is not applied.

SUMMARY

Exemplary embodiments of the present invention provide a method of forming an alignment layer using a photo-alignment method, and a method of manufacturing a liquid crystal display having increased display quality using the method of forming the alignment layer.

Exemplary embodiments of the present invention provide methods of manufacturing a liquid crystal display including forming a first alignment layer on a first base substrate, forming a second alignment layer on a second base substrate, dispensing a liquid crystal on the first alignment layer or the second alignment layer, and combining the first base substrate and the second base substrate with each other. Forming at least one of the first and second alignment layers includes forming an alignment solution on the first or second base substrate. The alignment solution includes an alignment agent and a cross-linking agent. The alignment solution is cured at a first temperature to form an alignment layer. The base substrate is exposed to light or an electron beam to align the alignment layer. The alignment layer is baked at a second temperature. The first temperature is lower than a cross-linking reaction temperature of the cross-linking agent.

At least one of the first and second alignment layers may include a polymer having a photolytic group.

The alignment agent may include a cyclobutane dianhydride or a derivative thereof and a diamine.

The alignment agent may include one or more compounds having Chemical Formula 1, and one or more compounds having Chemical Formula 2:

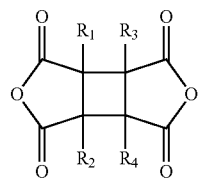

[Chemical Formula 1]

$R_1$, $R_2$, $R_3$, and $R_4$ may each independently be a hydrogen atom, a fluorine atom, or an alkyl group or alkoxy group having a carbon number of 1 to 6,

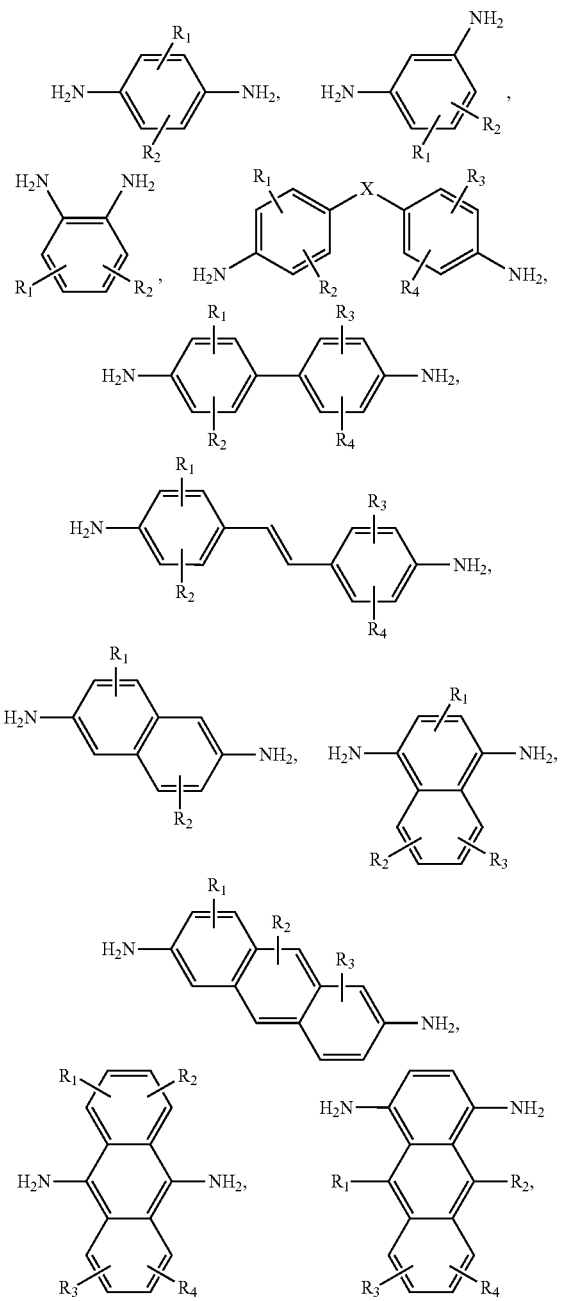

[Chemical Formula 2]

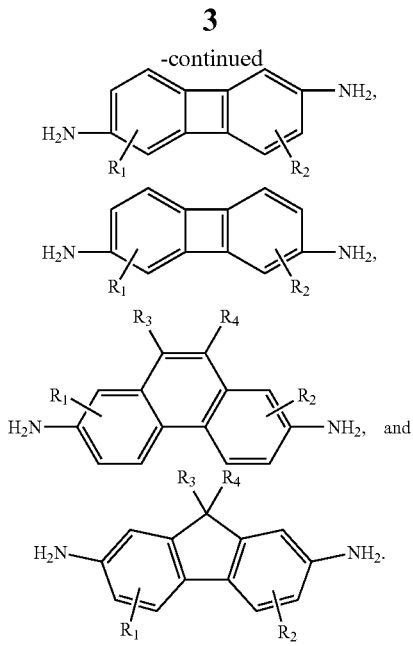

$R_1$, $R_2$, $R_3$, and $R_4$ may each independently be a hydrogen atom, a fluorine atom, an alkyl group or alkoxy group having a carbon number of 1 to 6, a vinyl group ($-(CH_2)_m-CH=CH_2$, m=0, 1, or 2), or an acetyl group ($-(CH_2)_n-C\equiv CH$, n=0, 1, or 2), and X is $-S-$, $-CO-$, or $-NH-$.

The cross-linking agent may include an oxirane compound, a melamine compound, an epoxy compound, an isocyanate compound, a polyol compound, or a bis-azide compound.

The cross-linking agent may be expressed by Chemical Formula 3:

[Chemical Formula 3]

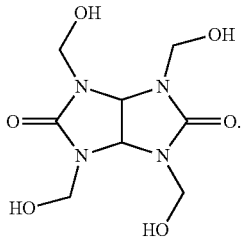

The alignment solution may include the cross-linking agent in an amount of 0.1 wt % to 7 wt % based on 100 wt % of the alignment solution.

The second temperature may be higher than the cross-linking reaction temperature.

The curing of the alignment solution may include pre-curing the alignment solution at a third temperature, and main curing the alignment solution at a fourth temperature that is higher than the third temperature.

The main curing may be performed for a longer period of time than the pre-curing.

The third temperature may be in a range of 65° C. to 80° C., and the fourth temperature may be in a range of 150° C. to 200° C. Pre-curing may be performed for 60 seconds to 300 seconds, and the main curing may be performed for 600 seconds to 1,000 seconds.

Baking may be performed for a longer period of time than main curing.

The second temperature may be in a range of 210° C. to 240° C., and the baking ma be performed for 1,200 seconds to 2,500 seconds.

The light may include ultraviolet light, infrared light, or far infrared light.

The light may be partially polarized or fully polarized light.

BRIEF DESCRIPTION OF THE DRAWINGS

The above and other features of the present inventive concept will become more apparent by describing in detail exemplary embodiments thereof, with reference to the accompanying drawings in which.

DETAILED DESCRIPTION OF THE EMBODIMENTS

Figure 1:
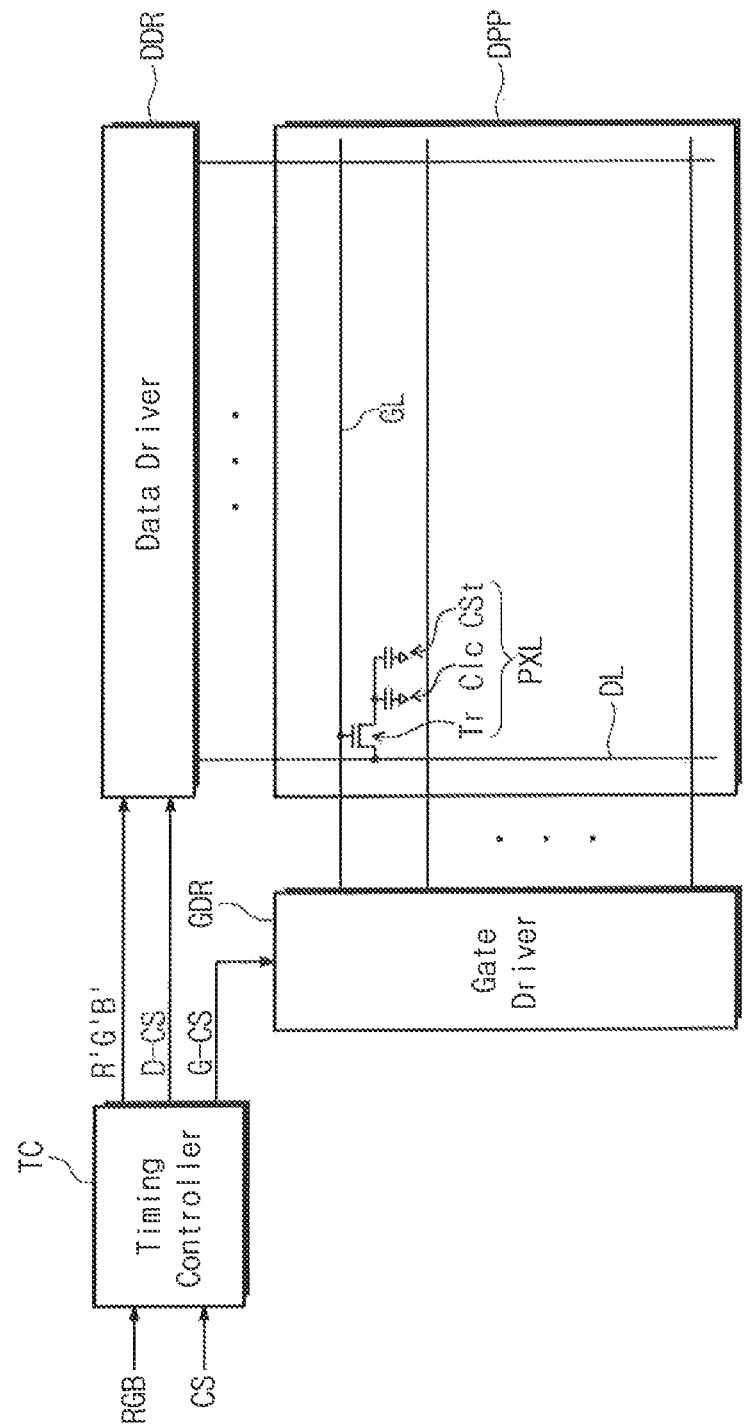
FIG. 1 is a block diagram of a liquid crystal display according to an exemplary embodiment of the present invention.

While the present invention is amenable to various modifications and alternative forms, specific exemplary embodiments of the present invention have been shown by way of example in the specification and drawings and are described in more detail below. The intention, however, is not to limit the exemplary embodiments of the present invention to the particular exemplary embodiments described.

Like reference numerals may refer to like elements throughout the specification and drawings. Sizes of elements in the drawings may be exaggerated for clarity of illustration. When an element such as a layer, film, region, or substrate is referred to as being "on" another element, it can be directly on the other element or intervening elements may also be present. In contrast, when an element such as a layer, film, region, or substrate is referred to as being "under" another element, it may be directly under the other element or intervening elements may also be present.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Hereinafter, exemplary embodiments of the present invention will be described in more detail with reference to the accompanying drawings.

Figure 2:
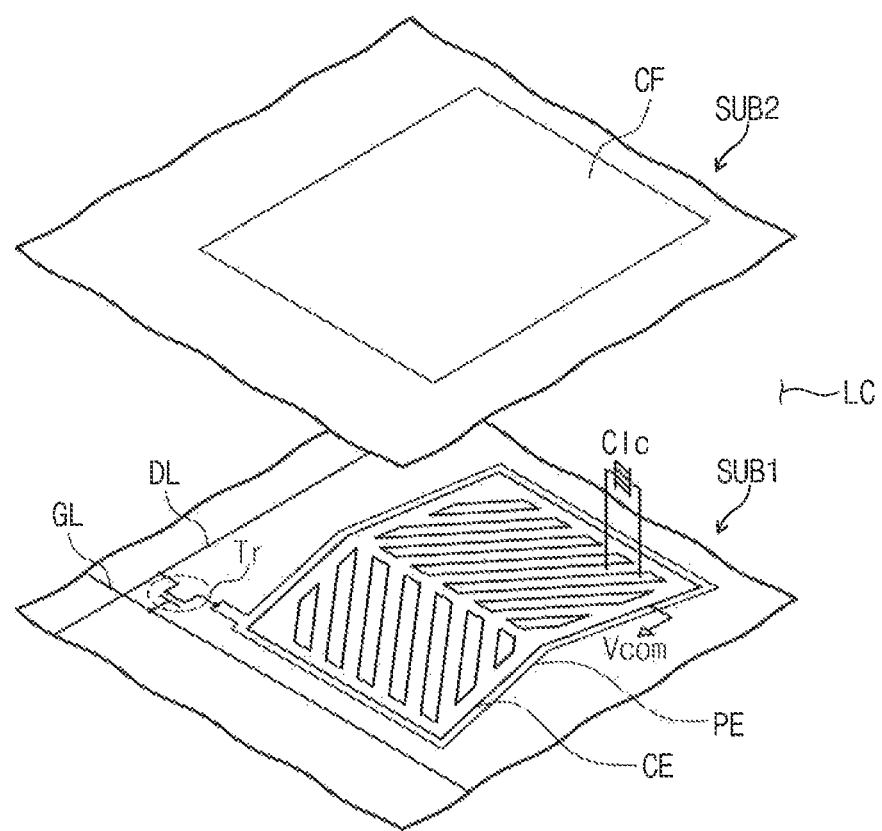
FIG. 2 is an equivalent circuit diagram of a pixel illustrated in FIG. 1.

FIG. 1 is a block diagram of a liquid crystal display according to an exemplary embodiment of the present invention, and FIG. 2 is an equivalent circuit diagram of a pixel illustrated in FIG. 1.

Referring to FIG. 1, a liquid crystal display according to an exemplary embodiment of the present invention includes an image display part DPP displaying an image, a gate driver GDR, a data driver DDR driving the image display part DPP, and a timing controller TC controlling the driving of the gate driver GDR and the data driver DDR.

The image display part DPP may include a plurality of gate lines GL, a plurality of data lines DL, and a plurality of pixels PXL. As illustrated in FIG. 2, the image display part DPP may include a liquid display panel composed of a first substrate SUB1, a second substrate SUB2 facing the first substrate SUB1, and a liquid crystal layer LC that may be disposed between the first substrate SUM and the second substrate SUB2.

The plurality of gate lines (IL and the plurality of data lines DL may be included on the first substrate SUB1. The plurality of gate lines GL may extend in a row direction and may be arranged parallel to one another in a column direction. The plurality of data lines DL may extend in the column direction and may be arranged parallel to one another in the row direction.

Each of the plurality of pixels PXL may be connected to the gate line GL and the data line DL and each pixel PXL may include a thin film transistor Tr, a liquid crystal capacitor Clc, and a storage capacitor Cst.

The thin film transistor Tr may include a gate electrode connected to the gate line GL, a source electrode connected to the data line DL, and a drain electrode connected to the liquid crystal capacitor Clc and the storage capacitor Cst.

The liquid crystal capacitor Clc may include a pixel electrode PE and a common electrode CE, which may be included in the first substrate SUB1, as two terminals, and the liquid crystal layer LC may act as a dielectric. The pixel electrode PE may be electrically connected to the drain electrode of the thin film transistor Tr, and the common electrode CE may receive a reference voltage Vcom.

The pixels PXL may be included in a region of the second substrate SUB2, which corresponds to the pixel electrode PE. The pixels may include a color filter CF for filtering a primary color. The color filter CF may be disposed above or under the pixel electrode PE disposed on the first substrate SUB1.

Referring to FIG. 1, the timing controller TC may receive a plurality of image signals RGB and a plurality of control signals CS from outside of the liquid crystal display. The timing controller TC may convert a data format of the image signals RGB to meet interface specifications of the data driver DDR and may provide converted image signals R'G'B' to the data driver DDR. The timing controller TC may generate a data control signal D-CS (e.g., an output start signal or a horizontal start signal) and a gate control signal GCS (e.g., a vertical start signal a vertical clock signal, and/or a vertical clock bar signal) on the basis of the plurality of control signals CS. The data control signal D-CS may be transmitted to the data driver DDR, and the gate control signal GCS may be transmitted to the gate driver GDR.

The gate driver GDR may respond to the gate control signal GCS transmitted from the timing controller TC and may sequentially output a gate signal. Thus, the plurality of pixels PXL may be sequentially scanned row by row by the gate signal.

The data driver DDR may respond to the data control signal D-CS transmitted from the timing controller TC and may output data voltages by converting the converted image signals R'G'B' to the data voltages. The output data voltages may be applied to the image display part DPP.

Each pixel PXL may be turned on by the gate signal and the turned-on pixel PXL may display an image having desired gradation by receiving the corresponding data voltage form the data driver DDR.

Figure 3:
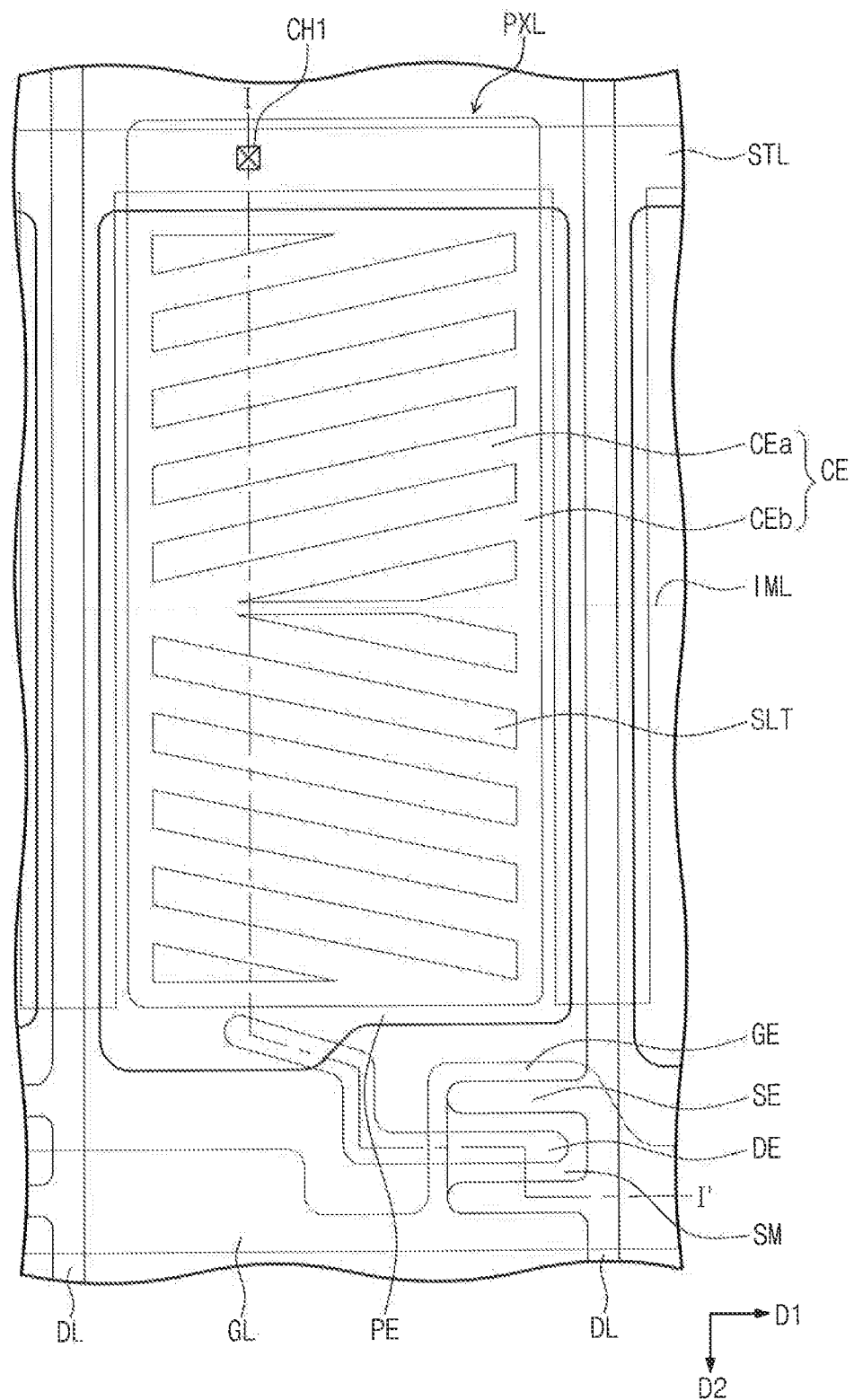
FIG. 3 is a plan view illustrating a liquid crystal display according to an exemplary embodiment of the present invention.
Figure 4:
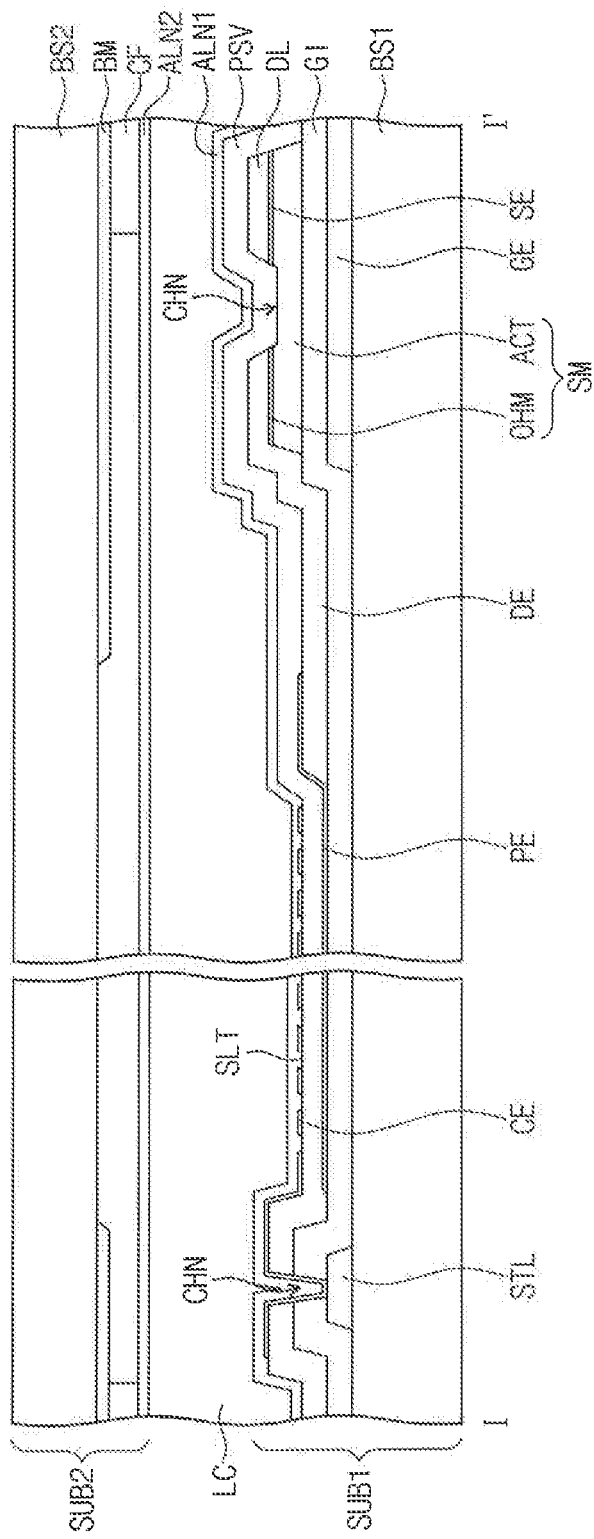
FIG. 4 is a cross-sectional view taken along line shown in FIG. 3.

FIG. 3 is a plan view illustrating a liquid crystal display according to an exemplary embodiment of the present invention, and FIG. 4 is a cross-sectional view taken along line I-I' shown in FIG. 3. Since each pixel may have substantially the same structure, a single pixel is illustrated with the gate lines and the data lines which are adjacent to the single pixel.

Referring to FIGS. 3 and 4, the liquid crystal display includes the first substrate SUB1, the second substrate SUB2 facing the first substrate SUB1, and the liquid crystal layer LC disposed between the first substrate SUB1 and the second substrate SUB2.

The first substrate SUB1 may include a first base substrate BS1, a plurality of gate lines GL, a plurality of data lines DL, a plurality of pixels PXL, and a first alignment layer ALN1 covering the pixels. The first base substrate BS1 may have an approximately rectangular shape and may include a transparent insulating material.

The gate lines GL may be formed by being extended in a first direction D1 on the first base substrate BS1.

A gate insulating layer GI may be disposed on the first base substrate BS1 on which the gate lines GL are formed. The gate insulating layer GI may include an insulating material, for example, silicon nitride or silicon oxide.

The data lines DL having the gate insulating layer GI disposed between the gate lines GL and the data lines DL may extend in a second direction D2 crossing the first direction D1.

Each pixel PXL may be connected to one of the gate lines GL and one of the data lines DL. Each pixel PXL may includes a thin film transistor, a pixel electrode PE connected to the thin film transistor, a passivation layer PSV covering the pixel electrode PE, a common electrode CE spaced apart from the pixel electrode PE, and a storage line STL connected to the common electrode CE and forming a storage capacitor by overlapping with the pixel electrode PE. The thin film transistor may include a gate electrode GE, the gate insulating layer GI, a semiconductor pattern SM, a source electrode SE, and a drain electrode DE.

The gate electrode GE may protrude from the gate line GL or may extend towards some areas of the gate line GL.

The gate electrode GE may include a metal. The gate electrode GE may include nickel, chromium, molybdenum, aluminum, titanium, copper, tungsten, and/or an alloy thereof. The gate electrode GE may include a single layer or multiple layers using the above metals. For example, the gate electrode GE may be a triple layer in which molybdenum, aluminum, and molybdenum are sequentially stacked, or a double layer in which titanium and copper are sequentially stacked. The gate electrode GE may be a single layer formed of an alloy of titanium and copper.

The gate insulating layer GI may be disposed on the entire surface of the first base substrate BS1 to cover the gate line GL.

The semiconductor pattern SM may be disposed on the gate insulating layer GI. The semiconductor pattern SM may be disposed on the gate electrode GE having the gate insulating layer GI disposed therebetween. Some areas of the semiconductor pattern SM may overlap the gate electrode GE. The semiconductor pattern SM may include an active pattern ACT formed on the gate insulating layer GI and an ohmic contact layer OHM formed on the active pattern ACT. The active pattern ACT may include an amorphous silicon thin film, and the ohmic contact layer OHM may include an n+ amorphous silicon thin film. The ohmic contact layer OHM may be disposed between the source electrode SE (described in more detail below) and some areas of the active pattern ACT and between the drain electrode DE (described in more detail below) and some other areas of the active pattern ACT. The ohmic contact layer OHM may form an ohmic contact between the active pattern ACT and the source electrode SE and drain electrode DE, respectively.

The source electrode SE may be branched from the data line DL. The source electrode SE is formed on the ohmic contact layer OHM and some areas thereof overlap the gate electrode GE.

The drain electrode DE may be spaced apart from the source electrode SE and the semiconductor pattern SM may be disposed therebetween. The drain electrode DE may be formed on the ohmic contact layer OHM and some areas thereof may overlap the gate electrode GE.

The source electrode SE and the drain electrode DE may include nickel, chromium, molybdenum, aluminum, titanium, copper, tungsten, and/or an alloy thereof. The source electrode SE and the drain electrode DE may be a single layer or multiple layers including the above metals. For example, the source electrode SE and the drain electrode DE may be a double layer in which titanium and copper are sequentially stacked. The source electrode SE and the drain electrode DE may be a single layer including an alloy including titanium and copper.

A top surface of the active pattern ACT between the source electrode SE and the drain electrode DE may be exposed to become a channel portion CHN constituting a conductive channel between the source electrode SE and the drain electrode DE depending on whether a voltage is applied to the gate electrode GE or not. The source electrode SE and the drain electrode DE may overlap a portion of the semiconductor pattern SM in an area except the channel portion CHN formed between and spaced apart from the source electrode SE and the drain electrode DE.

The pixel electrode PE may be disposed on the drain electrode DE and the gate insulating layer GI. A portion of the pixel electrode PE may be disposed directly on a portion of the drain electrode DE and the gate insulating layer GI and may be connected to the drain electrode DE. Accordingly, the portion of the pixel electrode PE may overlap the drain electrode DE in a plan view.

The pixel electrode PE may have an approximately rectangular shape in a plan view. However, exemplary embodiments of the present invention are not limited thereto, and the pixel electrode PE may have various shapes according to the shape of each pixel PXL. The pixel electrode PE may include a solid body in which a pattern, such as a slit, is not included.

The pixel electrode PE may include a transparent conductive material. For example, the pixel electrode PE may include a transparent conductive oxide. The transparent conductive oxide may include indium tin oxide (ITO), indium zinc oxide (IZO), and/or indium tin zinc oxide (ITZO).

The passivation layer PSV may be disposed on the first base substrate BS1 on which the pixel electrode PE is formed. The passivation layer PSV may cover the channel portion CHN and the pixel electrode PE. The passivation layer PSV, for example, may include silicon nitride or silicon oxide.

The common electrode CE may be formed on the passivation layer PSV. The common electrode CE may overlap a portion of the pixel electrode PE. In a plan view, the common electrode CE does not overlap a portion in which the pixel electrode PE overlaps the drain electrode DE. For example, when a first region of the pixel electrode PE overlaps the drain electrode DE and a second region of the pixel electrode PE does not overlap the drain electrode DE, the common electrode CE might not overlap the first region and may be spaced apart from the first region.

The common electrode CE may have a plurality of slits SLT which may be formed by removing portions of the common electrode CE. The slits SLT may have a surface inclined to the first direction D1 or the second direction D2. The common electrode CE may have a plurality of regions that are formed of slits SLT having different inclined surfaces, and the regions may be substantially line symmetrical with respect to an imaginary line crossing the pixel PXL or may be substantially point symmetrical with respect to any one point in the pixel PXL. FIG. 3 illustrates as an example that the slits SLT may be formed line-symmetrically with respect to an imaginary line IML crossing the pixel PXL in the first direction D1.

The common electrode CE may have stem portions CEa formed for each pixel PXL, and a plurality of branch portions CEb which may be divided by the slits SLT and may extend by protruding from the stem portions CEa. The branch portions CEb may be spaced apart from one another at a predetermined interval. The branch portions CEb of the common electrode CE may form an electric filed with the pixel electrode PE.

The branch portions CEb may be formed to parallelly extend in a predetermined direction. The stem portions CEa and the branch portions CEb may have various shapes. For example, all of the branch portions CEb may extend by protruding in both side directions that are perpendicular to an extending direction of the stem portions CEa. The stem portions CEa may be formed in a shape that is bent multiple times.

The common electrode CE may include a transparent conductive material. The common electrode CE, for example, may include a conductive metal oxide such as ITO, IZO, and/or ITZO.

The storage line STL may be spaced apart from the gate lines GL between the first base substrate BS1 and the gate insulating layer GI. The storage line STL may include the same material as the gate line GL and may be turned together with the gate line GL by a single patterning process.

The storage line STL may extend in the first direction D1 and may protrude in the second direction D2 to overlap portions of the data line DL and the pixel electrode PE. The storage line STL and the pixel electrode PE may form a storage capacitor having the gate insulating layer GI disposed therebetween.

A first contact hole exposing a portion of the storage line STL by removing a portion of the gate insulating layer GI and a portion of the passivation layer PSV may be disposed in the gate insulating layer GI and the passivation layer PSV. The common electrode CE may be connected to the storage line STL through the first contact hole. A same level of common voltage may be applied to the storage line STL and the common electrode CE. In an exemplary embodiment of the present invention, when the common voltage is applied to the common electrode CE of each pixel PXL through the storage line STL, a uniform level of voltage may be applied to the common electrode CE in the entire display area without a voltage drop.

The first alignment layer ALN1 may be disposed on the first base substrate SUB1 on which the common electrode CE may be formed, and may align liquid crystal molecules of the liquid crystal layer. The first alignment layer ALN1 may be formed by generating a photoreaction by irradiating a substrate, which is coated with a component of a photo-alignment layer to be described in more detail below, with partially polarized or fully polarized light. The photoreaction may align the liquid crystal molecules of the liquid crystal layer in one direction.

Other components may be included in the first alignment layer ALN1 providing anisotropy to the first alignment layer ALN1 by reacting when light is radiated onto the first alignment layer ALN1. For example, the first alignment layer ALN1 may include a polymer having a photo-reactive group, and when the photo reactive group is irradiated with light, the first alignment layer ALN1 may have directionality according to an irradiation direction of the light. The polymer may include polyamic acid, a partially imidized polyamic acid polymer, or a polyimide obtained by dehydration-cyclization of the polyamic acid.

According to an exemplary embodiment of the present invention, the photo-reactive group may be a photolytic group.

According to an exemplary embodiment of the present invention, the first alignment layer ALN1 may include polyamic acid and/or polyimide composed of a cyclobutane dianhydride or a derivative thereof and a diamine. The polyamic acid and polyimide may be cross-linked by a cross-linking agent.

The cyclobutane dianhydride may be cyclobutanetetracarboxylic acid dianhydride, and the diamine may be aromatic diamine. The cyclobutanetetracarboxylic acid dianhydride and the derivative thereof may be expressed by Chemical Formula 1 below.

[Chemical Formula 1]

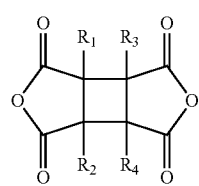

$R_1$, $R_2$, $R_3$, and $R_4$ may each independently be a hydrogen atom, a fluorine atom, or an alkyl group or alkoxy group having a carbon number of 1 to 6.

The aromatic diamine compound may include one of the following represented by Chemical Formula 2 below.

[Chemical Formula 2]

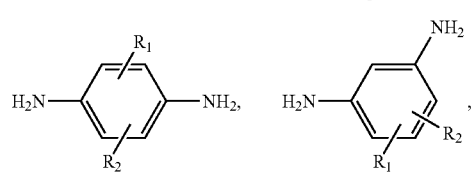

-continued

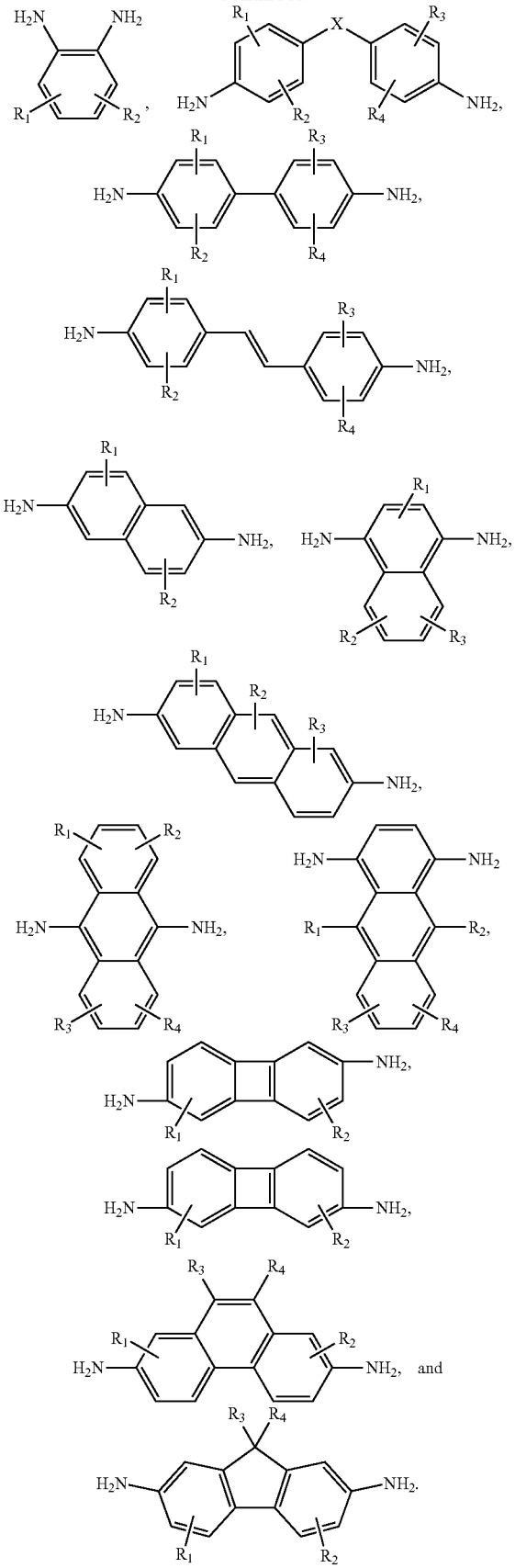

$R_1$, $R_2$, $R_3$, and $R_4$ may each independently be a hydrogen atom, a fluorine atom, an alkyl group or alkoxy group having a carbon number of 1 to 6, a vinyl group ($-(CH_2)_m-CH=CH_2$, m=0, 1, or 2), or an acetyl group n=0, 1, or 2), and X may be $-S-$, $-CO-$, or $-NH-$.

The cross-linking agent may react with a residual group of the polyamic acid or polyimide to combine the two. For example, the cross-linking agent may react with a residual carboxylic acid group of the polyamic acid. When the cross-linking agent reacts with the residual group of the polyamic acid or polyimide, the cross-linking agent may increase the strength of the alignment layer and, simultaneously, may increase torsional strength. In an exemplary embodiment of the present invention, the torsional strength represents the strength of a surface of the alignment layer, and may be measured by an amount of foreign matter produced when the surface of the alignment layer is scratched using a rubbing cloth. The larger the amount of foreign matter produced when the surface of the alignment layer is scratched, the lower the torsional strength is.

The cross-linking agent may include an oxirane compound, a melamine compound, an epoxy compound, an isocyanate compound, a polyol compound, or a bis-azide compound. The cross-linking agent may be expressed by the following Chemical Formula 3.

[Chemical Formula 3]

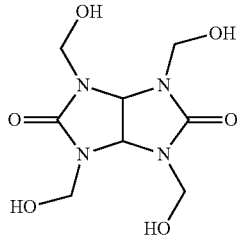

The second substrate SUB2 may include a second base substrate BS2, color filters CF, a black matrix BM, and a second alignment layer ALN2.

The color filters CF may provide colors to light passing through the liquid crystal layer LC. The color filters CF may include a red color filter, a green color filter, and/or a blue color filter. The red color filter, the green color filter, and/or the blue color filter may be arranged in one-to-one correspondence with each pixel PXL. The black matrix BM may block light leakage and may be disposed between adjacent pixels.

The second alignment layer ALN2 may be disposed on the color filter CF, and may align liquid crystal molecules of the liquid crystal layer LC similar to the first alignment layer ALN1. The second alignment layer ALN2 may be formed by generating a photoreaction by irradiating a substrate, which is coated with a component of the above-described photo-alignment layer, with partially polarized or fully polarized light. The photoreaction may align the liquid crystal molecules of the liquid crystal layer LC in one direction.

A material of the second alignment layer ALN2 may be the same or different from the material of the first alignment layer ALN1.

The liquid crystal layer LC including liquid crystal molecules may be disposed between the first substrate SUB1 and the second substrate SUB2.

In the liquid crystal display, the thin film transistor may be turned on when a gate signal is applied to the gate line GL. Thus, the data signal applied to the data line DL may be applied to the pixel electrode PE through the thin film transistor. When the data signal is applied to the pixel electrode PE when the thin film transistor is turned on an electric field may be formed between the pixel electrode PE and the common electrode CE. A voltage applied to the pixel electrode PE may be greater or smaller than a voltage applied to the common electrode CE. For example, a voltage of 0 V may be applied to the common electrode CE and a voltage of about 7 V may be applied to the pixel electrode PE. The liquid crystal molecules may be driven by the electric filed formed by the difference in voltages applied to the common electrode CE and the pixel electrode PE. Accordingly, the amount of light transmitted to the liquid crystal layer LC is changed to display an image.

In the liquid crystal display according to an exemplary embodiment of the present invention, the pixel electrode PE may include the solid body and the common electrode may have the plurality of slits SLT above the pixel electrode PE. However, exemplary embodiments of the present invention are not limited thereto. For example, a plurality of slits SILT may be formed on the pixel electrode PE and the pixel electrode PE may be disposed on the common electrode CE in exemplary embodiments of the present invention, the liquid crystal display may be operated in a plane-to-line switching (PLS) mode. According to an exemplary embodiment of the present invention, the pixel electrode PE may include a solid body without slits SLT. However, a plurality of slits SLT may be formed in the pixel electrode PE and the pixel electrode PE may have branch portions CEb. The branch portions CEb of the pixel electrode PE may be alternatingly arranged with the branch portions CEb of the common electrode on a plane to be operated in an in-plane switching (IPS) mode. The structure of the liquid crystal display may have a different mode, other than the PLS mode or IPS mode.

Hereinafter, a method of manufacturing the liquid crystal display according to an exemplary embodiment of the present invention will be described in more detail. However, descriptions overlapping with that of the foregoing liquid crystal display may be omitted.

Figure 5:
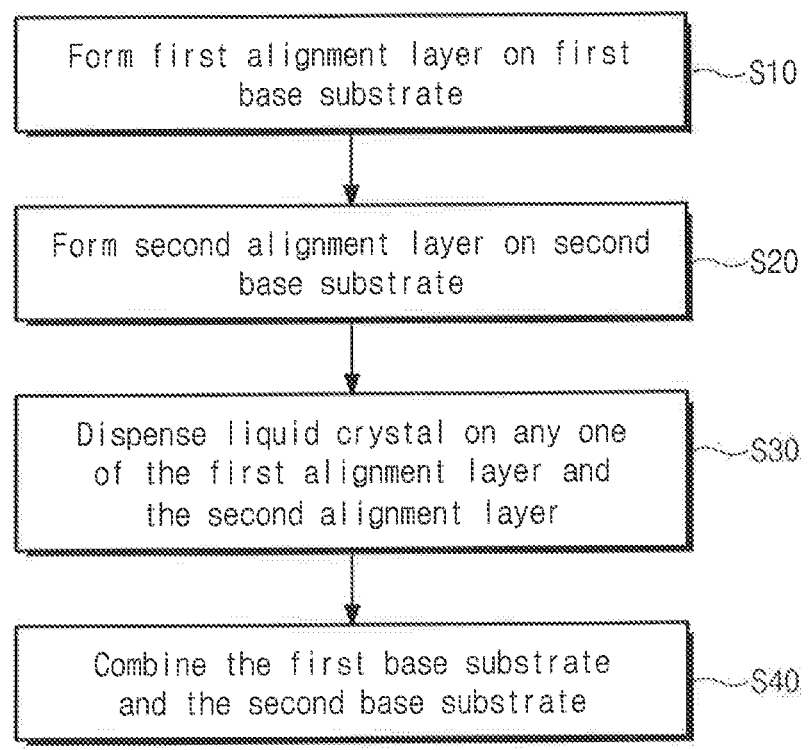
FIG. 5 is a flowchart illustrating a method of manufacturing a liquid crystal display according to an exemplary embodiment of the present invention.

FIG. 5 is a flowchart illustrating a method of manufacturing a liquid crystal display according to an exemplary embodiment of the present invention.

Referring to FIG. 5, the method of manufacturing the liquid crystal display according to an exemplary embodiment of the present invention includes the steps of forming a first alignment layer on a first base substrate to form the first substrate (S10), forming a second alignment layer on a second base substrate to form the second substrate (S20), dispensing a liquid crystal, for example, on either of the first alignment layer or the second alignment layer, between the first substrate and the second substrate (S30), and combining the first base substrate and the second base substrate (S40).

The first substrate may be formed by forming gate lines GL, data lines, DL and a plurality of pixels PXL connected to the gate lines GL and the data lines DL on the first base substrate, and forming first alignment layer on the pixels PXL.

Figure 6:
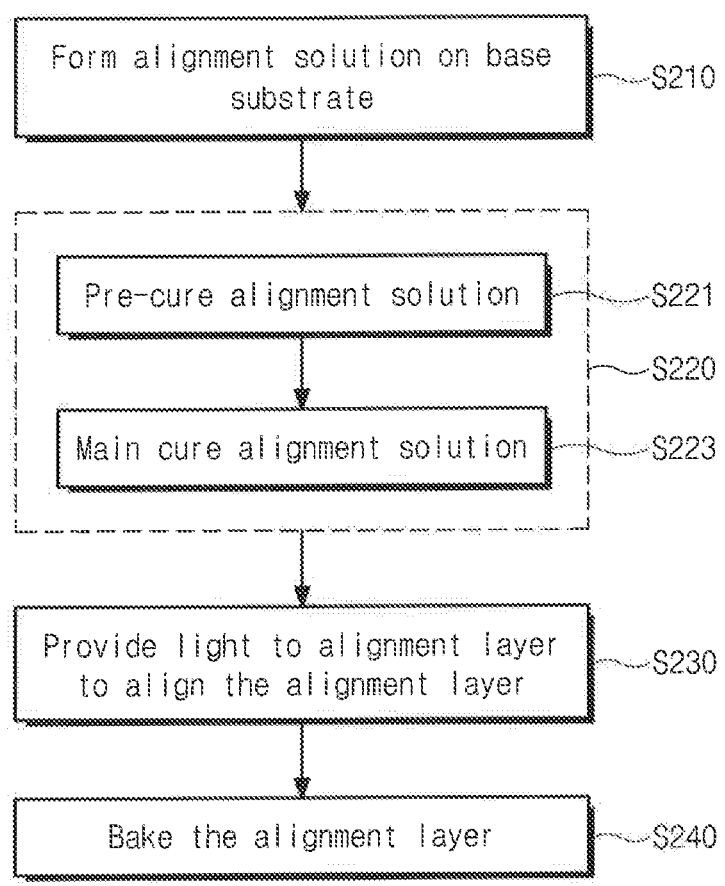
FIG. 6 is a flowchart illustrating a method of forming an alignment layer according to an exemplary embodiment of the present invention.

FIG. 6 is a flowchart illustrating a method of forming an alignment layer according to an exemplary embodiment of the present invention. At least one of the first alignment layer and the second alignment layer may be prepared by a method of FIG. 6.

Referring to FIG. 6, an alignment solution is formed on a base substrate (S210), the alignment solution is cured (S220), and the alignment layer is then aligned by providing light to the alignment layer (S230). Thereafter, the alignment layer is formed by baking the alignment layer (S240).

The method of forming the alignment layer according to an exemplary embodiment of the present invention will be described in more detail below with reference to FIGS. 5 and 6.

First, the alignment solution is formed on the base substrate (S210). The alignment solution may include an alignment agent, a cross-linking agent, and a solvent. The alignment agent may include a monomer of a polymer or a polymer precursor having a photolytic group (e.g., a photo-reactive group).

According to an exemplary embodiment of the present invention, the alignment agent may include the cyclobutane dianhydride or the derivative thereof and the diamine derivative. The cyclobutane dianhydride may be cyclobutanetetracarboxylic acid dianhydride, and the diamine may be aromatic diamine. The cyclobutanetetracarboxylic acid dianhydride and the derivative thereof may be expressed by Chemical Formula 1. The aromatic diamine compound may include a group expressed by Chemical Formula 2.

The cross-linking agent may be included in the alignment solution in an amount of about 0.1 wt % to about 7 wt %, or about 0.5 wt % to about 5 wt %, or about 1 wt %, based on 100 wt % of the alignment solution.

The cross-linking agent may react with the residual group of the polyamic acid or polyimide to combine the two. For example, the cross-linking agent may react with the residual carboxylic acid group of the polyamic acid. The cross-linking agent may include an oxirane compound, a melamine compound, an epoxy compound, an isocyanate compound, a glycol compound, and/or a bis-azide compound. The cross-linking agent may be a compound expressed by Chemical Formula 3.

A method of forming the alignment solution on the base substrate is not limited to the exemplary embodiments described herein. The alignment solution may be provided as a liquid, and the alignment solution may be formed on the first base substrate using a method such as spin coating, slit coating, or inkjet printing.

The alignment solution may be cured at a predetermined temperature (S220). The curing temperature of the alignment solution may be in a range of about 65° C. to about 200° C.

The curing process may be composed of pre-curing the alignment solution at a first temperature (S221) and main curing the alignment solution at a second temperature (S223) that is higher than the first temperature. The main curing may be performed for a longer period of time than the pre-curing. Most of the solvent in the alignment solution may be removed during the pre-curing, and the polymerization of the monomer or the precursor may be mostly completed during the main curing.

The first temperature and the second temperature may be set to a temperature at which a cross-linking reaction of the cross-linking agent does not occur. In a case where the cross-linking agent causes the cross-linking reaction during the pre-curing and the main-curing, molecules combined by the cross-linking agent may obstruct the rearrangement of the polymer during subsequent baking, and thus, an afterimage may increase.

According to an exemplary embodiment of the present invention, the first temperature may be in a range of about 65° C. to about 80° C., or may be about 72° C. The pre-curing process may be performed for about 60 seconds to about 300 seconds, or about 60 seconds to about 120 seconds, or about 70 seconds.

According to an exemplary embodiment of the present invention, the second temperature may be in a range of about 150° C. to about 200° C., or may be in a range of about 170° C. to about 200° C., or may be about 190° C. The main curing process may be performed for about 600 seconds to about 1,000 seconds, or about 700 seconds to about 900 seconds, or about 800 seconds.

Next, an exposure process (S230) for aligning the alignment layer by irradiating the alignment layer with partially polarized or fully polarized light may be performed. Anisotropy may be provided to the alignment layer through the alignment process of the alignment layer.

Light may cause a reaction of the photo-reactive group, and may be ultraviolet light, infrared light, far infrared light, an electron beam, and/or radiation. According to an exemplary embodiment of the present invention, the light may be ultraviolet light. For example, the light may be light having a wavelength of about 200 nm to about 250 nm, or light having a wavelength of about 200 nm to about 2.30 nm, or light having a wavelength of about 214 nm. The alignment layer may be irradiated with light having an exposure amount of about 0.3 J to about 2.0 J, or about 1.0 J to about 1.7 J, or about 1.5 J. The first base substrate may be irradiated with light in a vertical direction or an inclined direction, and an irradiation angle and exposure amount of light may be changed according to a driving mode of the liquid crystal display and physical properties of a material of the alignment layer.

Thereafter, although not shown in the drawings, the base substrate may be washed. The washing may be performed by wet washing or dry washing. The wet washing may be performed by a method of dipping the base substrate in the solvent or may be performed by a method of spraying the solvent on the base substrate using a spray nozzle. Deionized (DI) water or a bubble jet may be used for the wet washing. The dry washing may be performed by a method of spraying compressed air on the base substrate using the spray nozzle.

Next, the alignment layer is baked at a third temperature (S240). Since the cross-linking agent may cause a cross-linking reaction through the baking, reactive groups unstable after the exposure may be stabilized and substantially simultaneously, residual groups which did not reaction during the exposure may be cross-linked by the cross-linking agent. The remaining solvent may be finally removed and the polymerization of the alignment layer may be completed through the baking, and thus, the heat resistance of the alignment layer may be increased.

The third temperature may be set to a higher temperature than the second temperature. For example, the baking may be performed at a higher temperature than the main curing temperature. According to an exemplary embodiment of the present invention, the third temperature may be above a temperature at which the cross-linking agent causes the cross-linking reaction. According to an exemplary embodiment of the present invention, the baking may be performed in a temperature range of about 210° C. to about 240° C., or in a temperature range of about 220° C. to about 240° C., or at a temperature of about 230° C.

The baking may be performed for a longer period of time than the main curing time. The baking may be performed for about 1,200 seconds to about 2,500 seconds, or about 1,500 seconds to about 2,200 seconds, or about 1,800 seconds.

The baked base substrate may be cooled.

According to an exemplary embodiment of the present invention, the baked base substrate may be dry or wet washed before the liquid crystal layer is formed.

The liquid crystal layer may be formed on the first substrate SUB1 and/or the second substrate SUB2 having the alignment layer prepared by the above method.

According to an exemplary embodiment of the present invention, the cross-linking agent might not cause the cross-linking reaction during the curing, but may cause the cross-linking reaction during the baking. Residual groups of the polymer that did not react during the exposure may be cross-linked by the cross-linking agent. During the baking, the rearrangement of the polymer may provide anisotropy to the alignment layer, and the reaction of the cross-linking agent may occur simultaneously with the rearrangement of the polymer. The anisotropy of the polymer denotes that a polymer constituting the alignment layer has directionality by being arranged in a specific direction, and liquid crystal molecules may be arranged in a specific direction according to the anisotropy of the alignment layer when the alignment layer is used in the liquid crystal display. A cross-linking reaction temperature of the cross-linking agent denotes a temperature at which 50% or more of the cross-linking agent reacts, and the cross-linking reaction may partially occur even below the cross-linking reaction temperature.

Figure 7A:
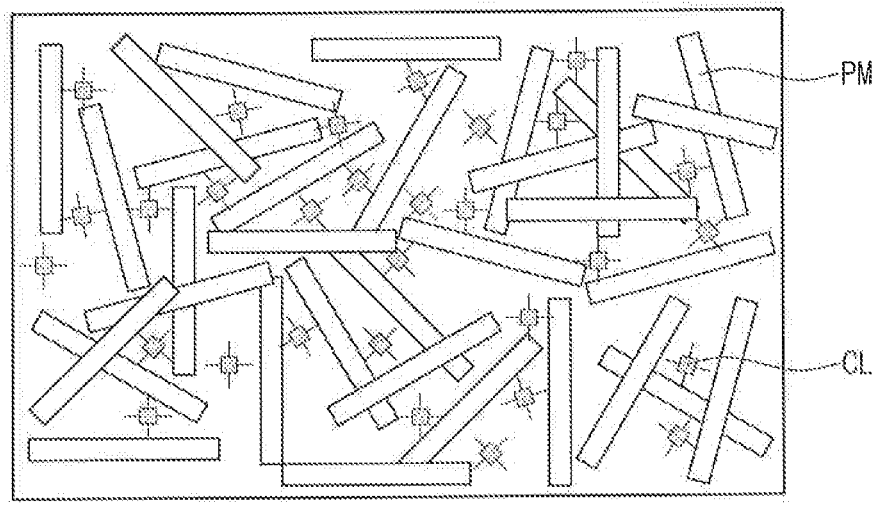
FIGS. 7A to 7C are plan views conceptually illustrating a process of forming the anisotropy of an alignment layer according to an exemplary embodiment of the present invention.
Figure 7B:
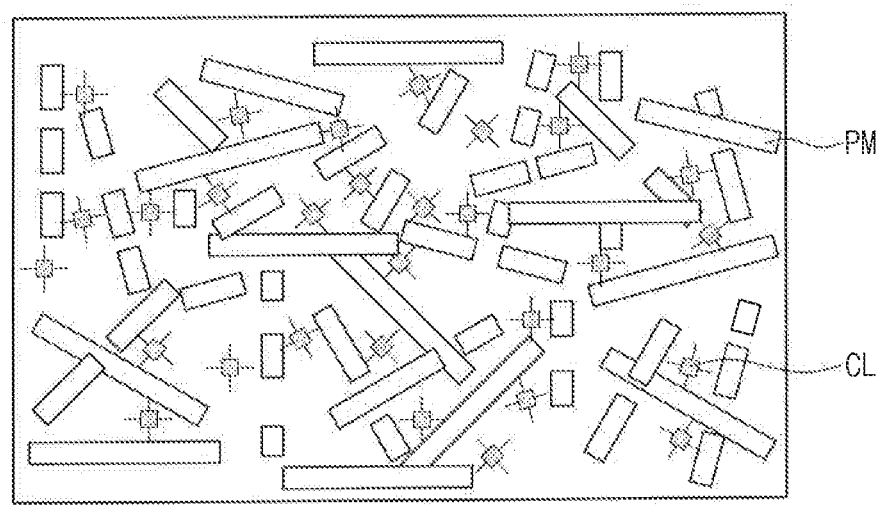
Figure 7C:
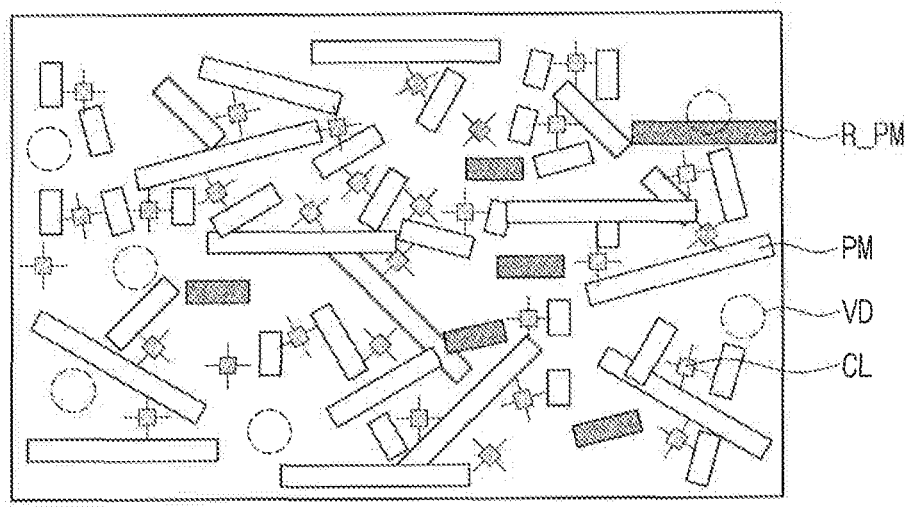

FIGS. 7A to 7C are plan views conceptually illustrating a process of forming the anisotropy of an alignment layer according to an exemplary embodiment of the present invention. FIG. 7A illustrates an appearance of the alignment layer before exposure after curing (e.g., after pre-curing and main curing). FIG. 7B illustrates an appearance of the alignment layer before baking after the exposure. 7C is a plan view illustrating an appearance of the alignment layer after the baking. In FIGS. 7A to 7C, a polymerized polymer is represented as PM, a cross-linking agent is represented as CL, a space in which small molecules are sublimated is represented as VD, and a rearranged polymer is represented as R_PM.

Referring to FIG. 7A, a polymerization reaction of the polymer occurs in the alignment layer subjected to the pre-curing and the main curing. When typical temperatures of the pre-curing and the main curing are higher than the cross-linking reaction temperature of the cross-linking agent, the cross-linking reaction of the cross-linking agent with the polymer may proceed. Accordingly, the polymerized polymer and the polymer may be cross-linked by the cross-linking agent.

Referring to FIG. 7B, the alignment layer is irradiated with partially polarized or fully polarized light in a predetermined direction through an exposure process. A portion of the polymer is photo-decomposed according to the irradiation direction and polarization direction of the light. For example, when viewed on the basis of a rectangular drawing in FIG. 7B, a decomposition reaction may occur in the polymer parallel to a short side direction and the polymer may be decomposed into smaller molecules. The decomposition reaction might not occur in the polymer parallel to a long side direction.

Referring to FIG. 7C, the small molecules decomposed during the baking may be sublimated and a non-cross-linked polymer may be rearranged while moving into the spaces, in which the small molecules are sublimated, by thermal energy during the baking. When the polymer cross-linked during the pre-curing and the main curing is bounded by the cross-linking agent, the rearrangement of the polymer may be difficult. Therefore, only a portion of the polymer might be rearranged.

According to an exemplary embodiment of the present invention, the alignment layer may be formed using a polymer alignment layer composed of a cyclobutane dianhydride of Chemical Formula 1 and a biphenyl amine of Chemical Formula 2, and a cross-linking agent of Chemical Formula 3, wherein the temperatures of the pre-curing and the main curing are higher than the reaction temperature of the cross-linking agent, and a reaction such as the following Chemical Formula 4 occurs during the curing.

[Chemical Formula 4]

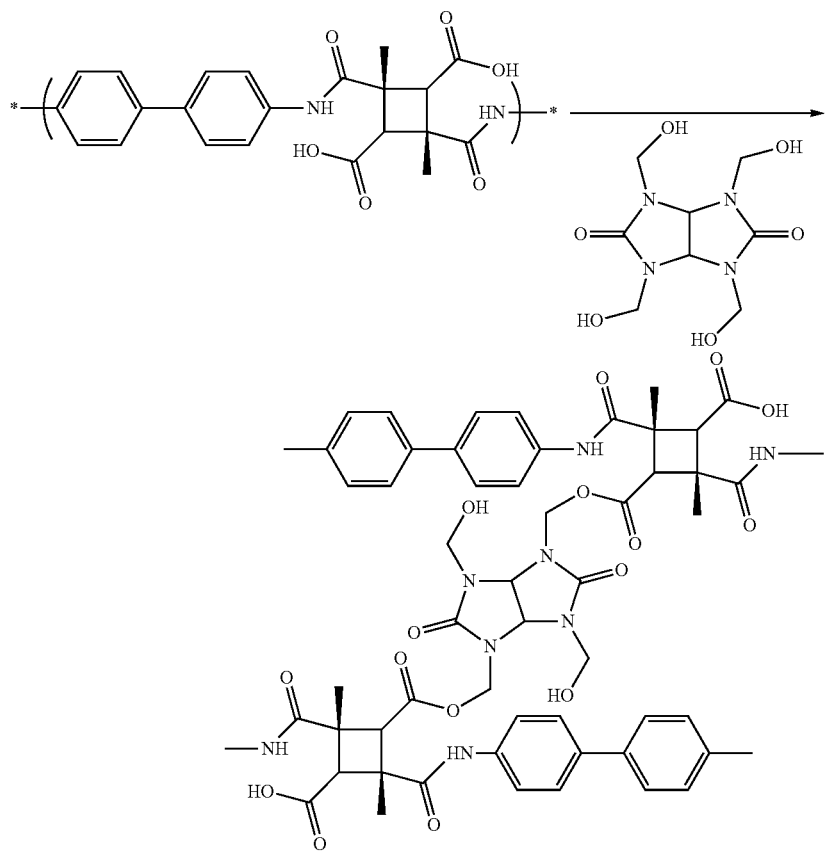

Referring to Chemical Formula 4, according to an exemplary embodiment of the present invention, the cross-linking reaction of the cross-linking agent may occur earlier than an imidization reaction of the cyclobutane dianhydride and the biphenyl amine, and a portion of a polyimide polymer may be partially cross-linked as illustrated in Chemical Formula 4. Flexibility of the polyimide polymer partially cross-linked as in Chemical Formula 4 may be decreased. An additional imidization reaction might not occur due to steric hindrance caused by the cross-linking agent. Rearrangement ability of the cross-linked polymer may be decreased and directionality of the alignment layer (e.g., anisotropy) may be decreased.

Figure 8A:
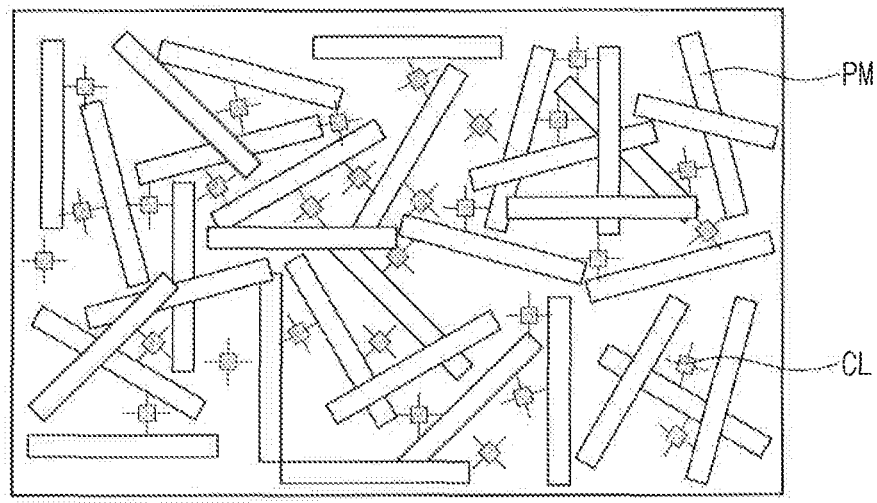
FIGS. 8A to 8C are plan views conceptually illustrating a process of forming the anisotropy of an alignment layer according to an exemplary embodiment of the present invention.
Figure 8B:
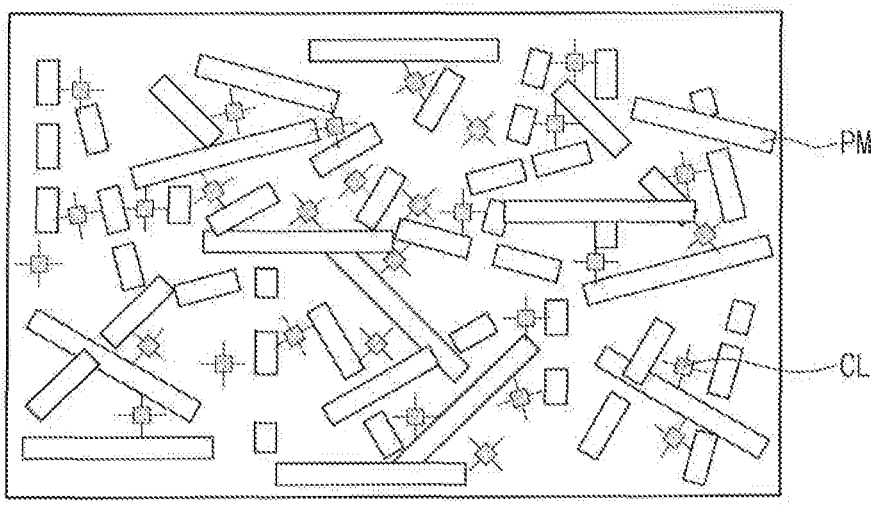
Figure 8C:
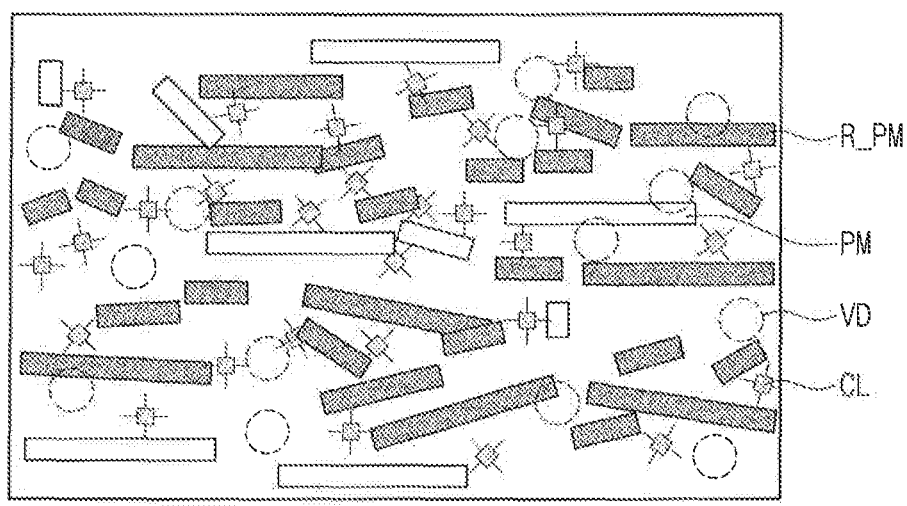

FIGS. 8A to 8C are plan views conceptually illustrating a process of forming the anisotropy of an alignment layer according to an exemplary embodiment of the present invention. FIG. 8A illustrates an appearance of the alignment layer before exposure after pre-curing and main curing. FIG. 8B illustrates an appearance of the alignment layer before baking after the exposure. FIG. 8C is a plan view illustrating an appearance of the alignment layer after the baking. In FIGS. 8A to 8C, the polymerized polymer is represented as PM, the cross-linking agent is represented as CL, the space in which small molecules are sublimated is represented as VD, and the rearranged polymer is represented as R_PM.

Referring to FIG. 8A, the polymerization reaction of the polymer may occur in the alignment layer subjected to the pre-curing and the main curing to form networks. When typical temperatures of the pre-curing and the main curing are set to be lower than the cross-linking reaction temperature of the cross-linking agent, the cross-linking agent might not react with the polymer. The polymerized polymer and the polymer might not be cross-linked by the cross-linking agent.

Referring to FIG. 8B, the alignment layer may be irradiated with partially polarized or fully polarized light in the predetermined direction through the exposure process. A portion of the polymer may be photo-decomposed according to the irradiation direction and polarization direction of the light. When viewed on the basis of the rectangular drawing in FIG. 8B, the decomposition reaction may occur in the polymer parallel to the short side direction and the polymer may be decomposed into smaller molecules. The decomposition reaction might not occur in the polymer parallel to the long side direction. In FIG. 8B, when no or only a relatively small portion of the polymer is cross-linked by the cross-linking agent, the polymer may be decomposed into smaller molecules.

Referring to FIG. 8C, the small molecules decomposed during the baking may be sublimated and the non-cross-linked polymer may be rearranged while moving into the spaces, in which the small molecules may be sublimated by thermal energy during the baking. In an exemplary embodiment of the present invention, when the polymer is not bounded by the cross-linking agent, rearrangement may occur, and a relatively lame portion of the polymers may be rearranged. Residual groups of the polymer may be cross-linked by the cross-linking agent substantially simultaneously with the rearrangement.

According to an exemplary embodiment of the present invention, when the alignment layer is formed using the polymer alignment layer composed of the cyclobutane dianhydride of Chemical Formula 1 and the biphenyl amine of Chemical Formula 2, and the cross-linking agent of Chemical Formula 3, and when the temperatures of the pre-curing and the main curing are lower than the reaction temperature of the cross-linking agent, the cross-linking reaction of the cross-linking agent might not occur during the pre-curing and the main curing. In the alignment layer according to an exemplary embodiment of the present invention, an imidization reaction such as the following Chemical 5 may occur during the curing.

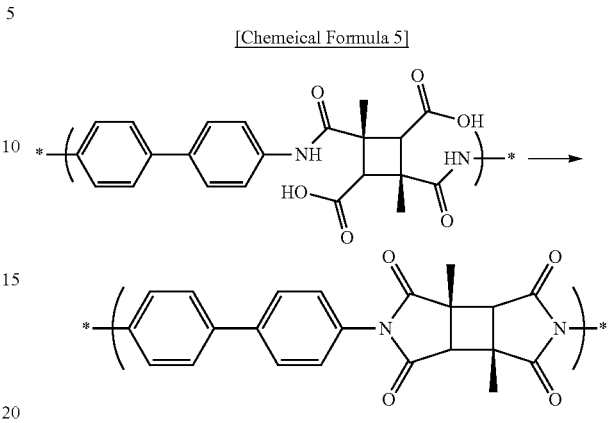

[Chemeical Formula 5]

Referring to Chemical Formula 5, the imidization reaction of the cyclobutane dianhydride and the biphenyl amine may occur. After the imidization reaction, a portion of the polyimide may be decomposed during the exposure, and the portion of the polyimide and the cross-linking agent may be reacted and cross-linked during the baking. The flexibility of the polyimide polymer may increase during the baking, and the rearrangement ability of the polymer as well as the anisotropy of the alignment layer may increase.

Figure 9:
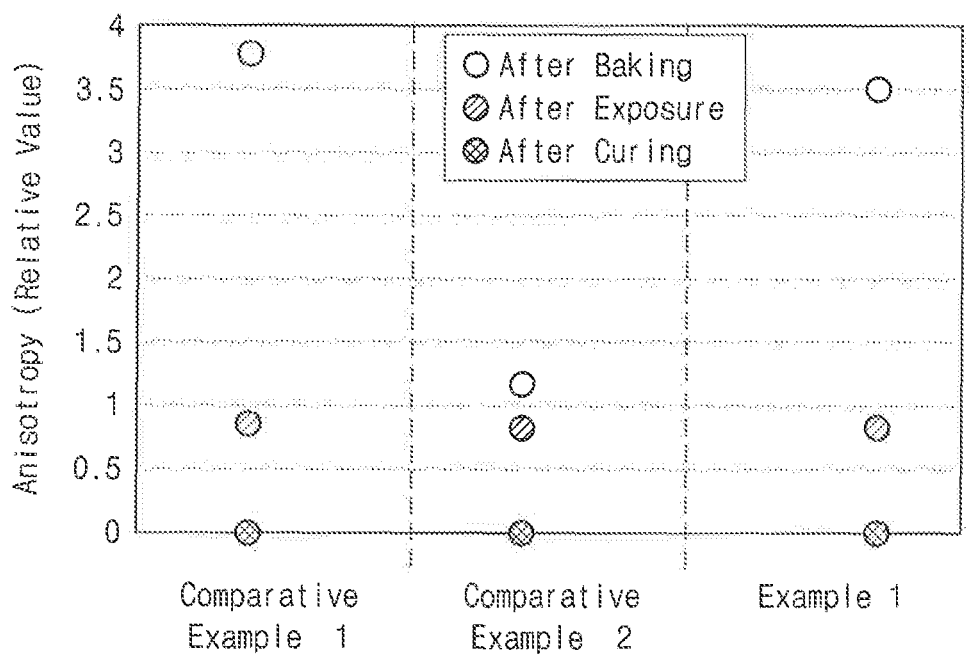
FIG. 9 is a graph illustrating the anisotropies of alignment layers according to exemplary embodiments of the present invention.

FIG. 9 is a graph illustrating the anisotropies of alignment layers according to exemplary embodiments of the present invention. Comparative Example 1 of the graph of FIG. 9 represents a case in which the alignment layer may be formed by a typical method without the addition of the cross-linking agent, and Comparative Example 2 represents a case in which the alignment layer may be formed by the typical method after the cross-linking agent is added in an amount of 5 wt % based on 100 wt % of a total alignment solution. Example 1 of the graph of FIG. 9 represents a case in which the alignment layer may be formed by the method according to an exemplary embodiment of the present invention after the cross-linking agent is added in an amount of 5 wt % based on 100 wt % of a total alignment solution. In FIG. 9, the anisotropy of the alignment layers may be presented as a relative value.

Comparative Example 1, Comparative Example 2, and Example 1 may be performed under the same conditions except temperatures of pre-curing, main curing, and baking, and the cross-linking agents. With respect to Comparative Examples 1 and 2, the temperatures of the pre-curing and the main curing may be 210° C., and with respect to Example 1, the temperatures of the pre-curing and the main curing may be 190° C.

Referring to FIG. 9, in Comparative Example 1, the anisotropy of the alignment layer may increase in the sequence of after curing, after exposure, and after baking. For example, the anisotropy of the alignment layer after baking may have a value of about 3.5 or more. In an exemplary embodiment of the present invention, although not separately illustrated, it should be noted that the anisotropy of the alignment layer itself in Comparative Example 1 may have a high value, but torsional strength may be relatively low.

In Comparative Example 2, the anisotropy of the alignment layer may increase in the sequence of after curing, after exposure, and after baking. However, the anisotropy of the alignment layer after baking may be about 1.2, which may be a significantly lower value than that of Comparative Example 1 in which the cross-linking agent was not added. The reason for this is that the rearrangement of the polymer cross-linked during curing may be decreased by the cross-linking agent.

In Example 1, the anisotropy of the alignment layer may increase in the sequence of after curing, after exposure, and after baking, and may have a value corresponding to Comparative Example 1 in which the cross-linking agent was not added. For example, the anisotropy of the alignment layer after the baking may have a value of about 3.5. Herein, although not separately illustrated, a value of torsional strength in Example 1 may be relatively high.

As described above, the alignment layer according to an exemplary embodiment of the present invention may increase rearrangement ability and directionality of the polymer. The increases in rearrangement ability and directionality of the polymer may decrease the afterimage. If a difference between an initial azimuth of liquid crystal molecules aligned by the alignment layer and an azimuth of liquid crystal molecules obtained when an electric filed is applied to the liquid crystal and then removed is denoted as azimuthal variation, the azimuthal variation of the alignment layer according to an exemplary embodiment of the present invention may be lower than that of the comparative examples. The greater the azimuthal variation is, the higher the incidence of afterimage may be.

Figure 10:
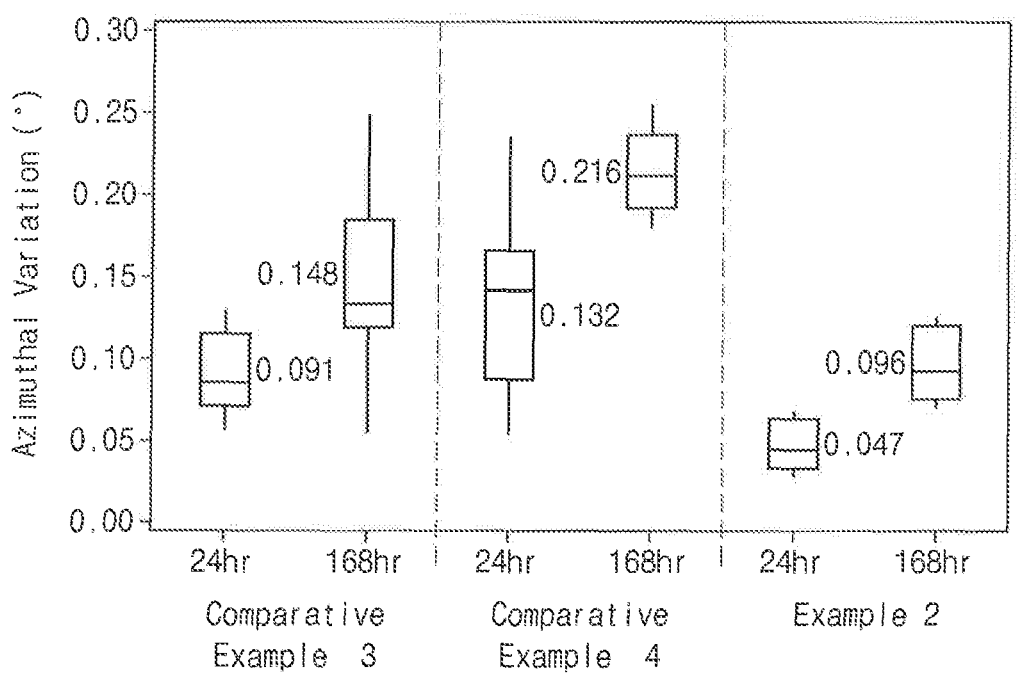
FIG. 10 is a graph illustrating azimuthal variations of liquid crystal molecules in liquid crystal displays using alignment layers according to exemplary embodiments of the present invention.

FIG. 10 is a graph illustrating azimuthal variations of liquid crystal molecules in liquid crystal displays using alignment layers according to exemplary embodiments of the present invention. Comparative Example 3 of the graph of FIG. 10 represents a case in which the alignment layer may be formed by a typical method after the cross-linking agent may be added in an amount of 1 wt % based on 100 wt % of the total alignment solution. Comparative Example 4 represents a case in which the alignment layer may be formed by the typical method after the cross-linking agent is added in an amount of 5 wt % based on 100 wt % of the total alignment solution. Example 2 represents a case in which the alignment layer may be formed by the method according to an exemplary embodiment of the present invention after the cross-linking agent is added in an amount of 1 wt % based on 100 wt % of the total alignment solution.

Comparative Example 3, Comparative Example 4, and Example 2 may be performed under the same conditions except temperatures of pre-curing, main curing, and baking, and the cross-linking agents. With respect to Comparative Examples 3 and 4, the temperatures of pre-curing and main curing may be 210° C., and with respect to Example 2, the temperatures of pre-curing and main curing may be 190° C. Azimuthal variation of each liquid crystal of Comparative Example 3, Comparative Example 4, and Example 2 may be calculated by respectively measuring an azimuth when an electric field is not applied to the liquid crystal and azimuths when the electric field is applied for 24 hours and 168 hours and the electric filed is then removed.

Referring to FIG. 10, azimuthal variation of Example 2 may be significantly lower than azimuth variations of Comparative Examples 3 and 4, and the afterimage may be decreased.

According to an exemplary embodiment of the present invention, the method of forming the alignment layer using the photo-alignment method may be provided.

According to an exemplary embodiment of the present invention, a high-quality liquid crystal display having a reduced failure rate may be manufactured.

While exemplary embodiments of the present invention have been particularly shown and described with reference to the accompanying drawings, it will be understood by those of ordinary skill in the art that various changes in form and detail may be made therein without departing from the spirit and scope of the present invention.

What is claimed is:

1. A method of manufacturing a liquid crystal display, the method comprising:
    forming a first alignment layer on a first base substrate;
    forming a second alignment layer on a second base substrate;
    disposing liquid crystal on the first alignment layer or the second alignment layer; and
    combining the first base substrate and the second base substrate with each other,
    wherein the forming of at least one of the first and second alignment layers comprises;
        forming an alignment solution on the first or second base substrate, wherein the alignment solution comprises an alignment agent and a cross-linking agent;
        curing the alignment solution at a first temperature to form an alignment layer;
        exposing the base substrate to light or an electron beam to align the alignment layer; and
        baking the alignment layer at a second temperature,
    wherein the first temperature is lower than a cross-linking reaction temperature of the cross-linking agent.

2. The method of claim 1, wherein at least one of the first and second alignment layers comprises a polymer having a photolytic group.

3. The method of claim 2, wherein the alignment agent comprises a cyclobutane dianhydride or a derivative thereof and a diamine.

4. The method of claim 3, wherein the alignment agent comprises one or more compounds having Chemical Formula 1, and one or more compounds having Chemical Formula 2:

[Chemical Formula 1]

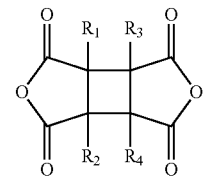

wherein $R_1$, $R_2$, $R_3$, and $R_4$ are each independently a hydrogen atom, a fluorine atom, or an alkyl group or alkoxy group having a carbon number of 1 to 6,

[Chemical Formula 2]

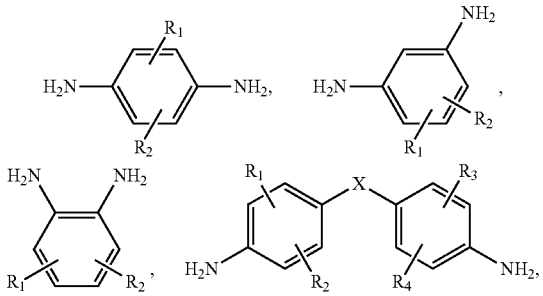

-continued

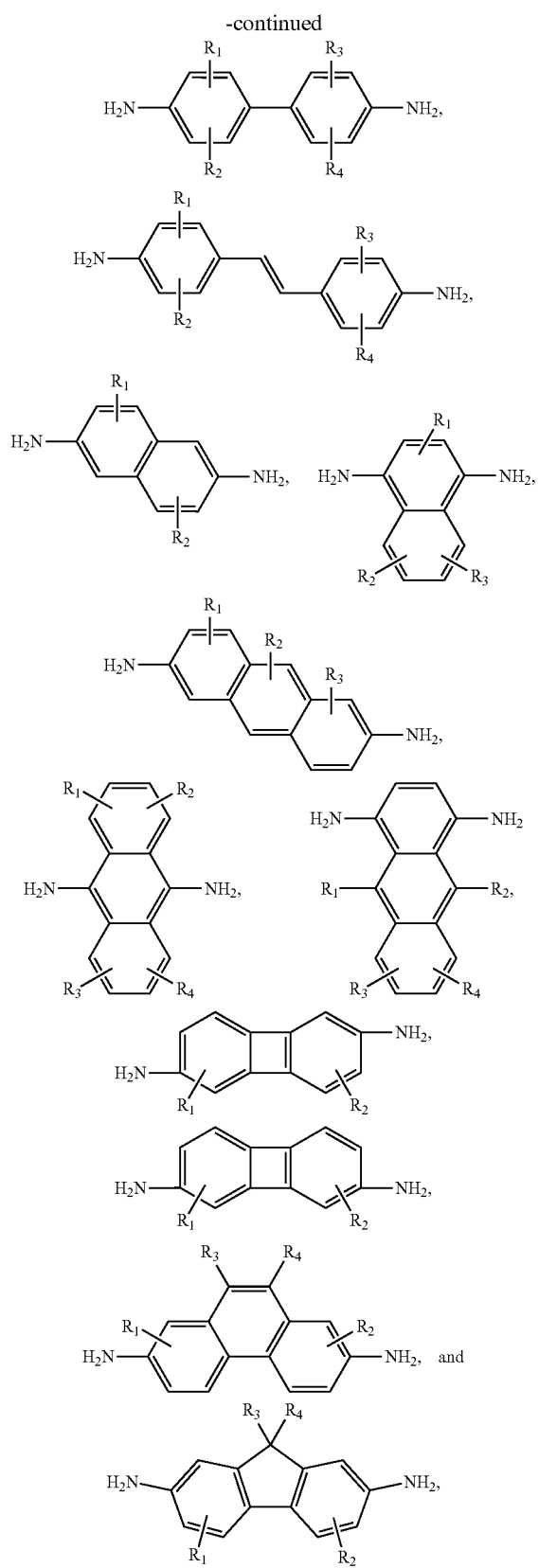

wherein $R_1$, $R_2$, $R_3$, and $R_4$ are each independently a hydrogen atom, a fluorine atom, an alkyl group or alkoxy group having a carbon number of 1 to 6, a vinyl group (—$(CH_2)_m$—CH=$CH_2$, m=0, 1, or 2), or an acetyl group (—$(CH_2)_n$—C≡CH, n=0, 1, or 2), and X is —S—, —CO—, or —NH—.

5. The method of claim 4, wherein the cross-linking agent comprises an oxirane compound, a melamine compound, an epoxy compound, an isocyanate compound, a polyol compound, or a bis-azide compound.

6. The method of claim 4, wherein the cross-linking agent is expressed by Chemical Formula 3:

[Chemical Formula 3]

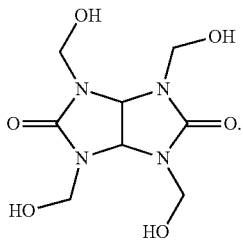

7. The method of claim 1, wherein the alignment solution comprises the cross-linking agent in an amount of 0.1 wt % to 7 wt % based on 100 wt % of the alignment solution.

8. The method of claim 1, wherein the second temperature is higher than the cross-linking reaction temperature.

9. The method of claim 1, wherein the curing of the alignment solution comprises:
pre-curing the alignment solution at a third temperature; and
main curing the alignment solution at a fourth temperature that is higher than the third temperature.

10. The method of claim 9, wherein the main curing is performed for a longer period of time than the pre-curing.

11. The method of claim 10, wherein the third temperature is in a range of 65° C. to 80° C. and the fourth temperature is in a range of 50° C. to 200° C., and
the pre-curing is performed for 60 seconds to 300 seconds and the main curing is performed for 600 seconds to 1,000 seconds.

12. The method of claim 10, wherein the baking is performed for a longer period of time than the main curing.

13. The method of claim 12, wherein the second temperature is in a range of 210° C. to 240° C., and the baking is performed for 1,200 seconds to 2,500 seconds.

14. The method of claim 1, wherein the light comprises ultraviolet light, infrared light, or far infrared light.

15. The method of claim 14, wherein the light is partially polarized or fully polarized light.

16. A method of forming an alignment layer of a liquid crystal display, comprising:
forming an alignment solution on a base substrate;
curing the alignment solution at a first temperature to form an alignment layer;
exposing the base substrate to light or an electron beam to align the alignment layer; and
baking the alignment layer at a second temperature, wherein the first temperature is lower than a cross-linking reaction temperature of the alignment solution, and
wherein the cross linking agent is expressed by Chemical Formula 3:

[Chemical Formula 3]

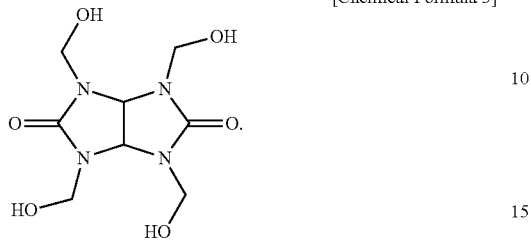

17. The method of forming an alignment layer of a liquid crystal display of claim 16, wherein curing the alignment solution comprising pre-curing the alignment solution and main curing the alignment solution.

18. The method of forming an alignment layer of a liquid crystal display of claim 17, wherein the temperature of the pre-curing and the main curing is 190° C.

19. The method of forming an alignment layer of a liquid crystal display of claim 16, wherein the second temperature is higher than the cross-linking temperature.

20. The method of forming an alignment layer of a liquid crystal display of claim 16, wherein the second temperature is in a range of 210° C. to 240° C.

* * * * *